Figure 1:
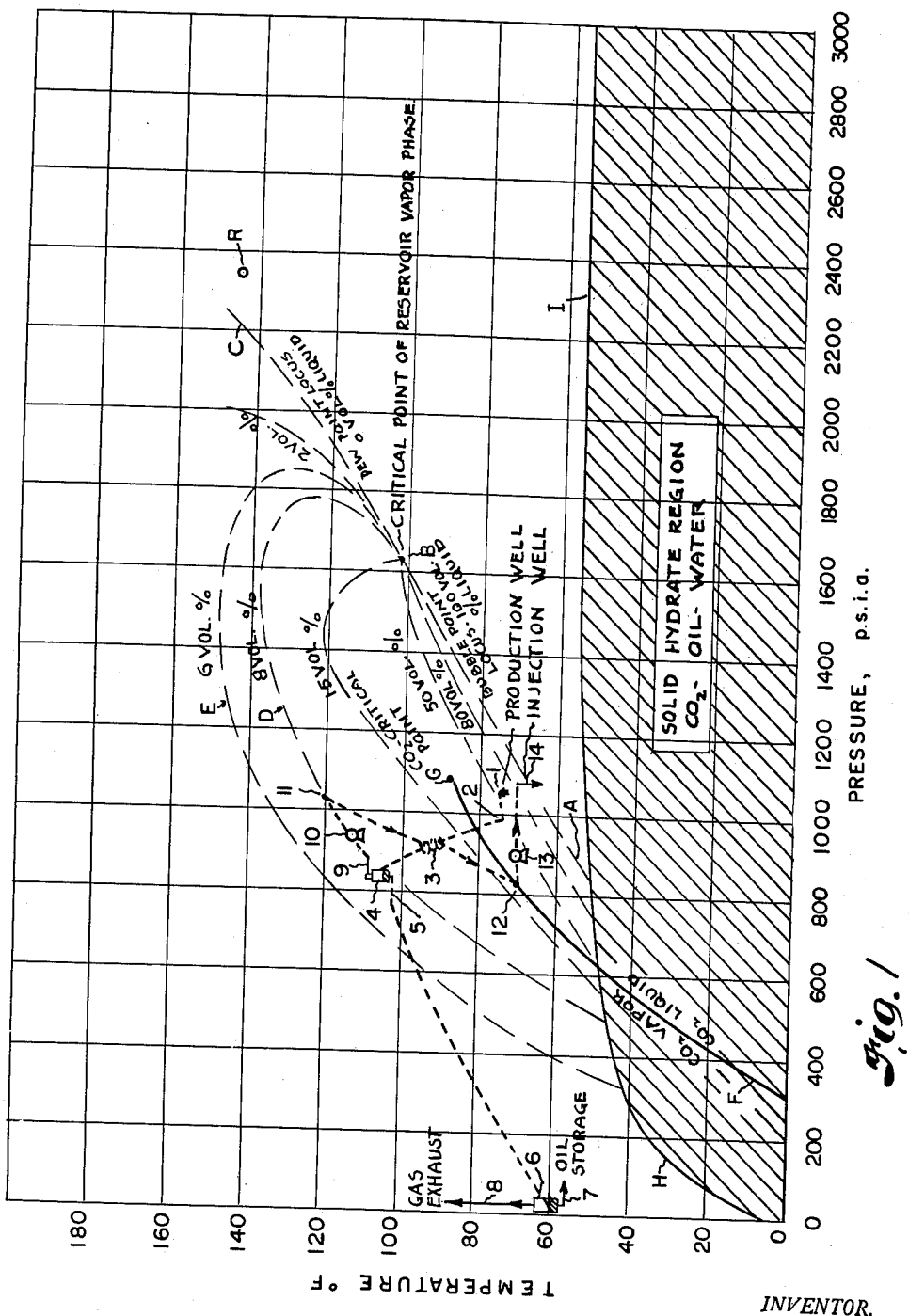

Jan. 3, 1956     F. B. HAVERFIELD     2,729,291
SEPARATING $CO_2$-PETROLEUM MIXTURES
Filed March 22, 1952     2 Sheets-Sheet 2

INVENTOR.
FERN B. HAVERFIELD
BY
Oberlin & Limbach
ATTORNEYS.

United States Patent Office 2,729,291
Patented Jan. 3, 1956

2,729,291

SEPARATING CO₂-PETROLEUM MIXTURES

Fern B. Haverfield, Houston, Tex., assignor to Continental Oil Company, Ponca City, Okla., a corporation of Delaware Application March 22, 1952, Serial No. 278,001

6 Claims. (Cl. 166—7)

This invention is concerned with the separation of highly pressured $CO_2$-hydrocarbon mixtures which form a single homogeneous vapor phase above the critical conditions of temperature and pressure for $CO_2$. This application is a continuation-in-part of my pending United States application, Serial No. 587,378, filed April 9, 1945, now abandoned.

More particularly, this invention relates to a process for recovering the normally liquid hydrocarbon component from naturally occurring reservoirs containing petroleum and $CO_2$ as a homogeneous vapor phase mixture; such mixtures exist as homogeneous and gaseous fluids when above the dew point pressure and temperature of the hydrocarbon component therein. The process is also applicable to reservoirs undergoing secondary recovery by $CO_2$ injection.

Natural reservoirs are known, e. g., at Walden, Colorado, wherein the producible fluid exists as a homogeneous vapor phase mixture of $CO_2$ and petroleum hydrocarbons. Such a vapor phase mixture may contain as much as 10–12 mol. per cent of vaporized normally liquid hydrocarbon material which, on a weight basis, amounts ot approximately 25–30 per cent. In order for such a reservoir to contain appreciable amounts of hydrocarbons in vapor phase mixture with $CO_2$, conditions of pressure and temperature would have to be at least about 1600 p. s. i. and 100° F. For example, a known reservoir existing at about 2350 p. s. i. and about 145° F. has in it a homogeneous $CO_2$ vapor phase fluid which contains about 2 mol. per cent (6.3 weight per cent) of a 48° A. P. I. petroleum; this corresponds to a gas/oil ratio of about 33,000 cu. ft. $CO_2$ per barrel of oil (standard at 14.7 p. s. i. a. and 60° F.). In the case of $CO_2$ vapor phase mixtures, it was found that the gravity of the vapor phase oil may be even lower, to about 35° A. P. I. and perhaps as low as about 30° A. P. I.

Vapor mixtures containing larger amounts of phase oil occur at higher conditions of pressure and temperature; for example a $CO_2$ vapor phase mixture containing about 10 mol. percent of normally liquid hydrocarbons requires about 3000 p. s. i. a. at about 200° F. When a reservoir is operated for secondary recovery by means of $CO_2$ injection, the foregoing conditions are not far from the upper limits for efficient utilization of $CO_2$ in this way.

The $CO_2$ vapor phase reservoirs considered here may also contain liquid petroleum as such with which the vapor phase may be in contact. Such formations may flow both petroleum oil and the $CO_2$ vapor mixture to a well producing therefrom.

When such vapor phase reservoirs are produced through a well, the vapor undergoes progressive condensation up the well bore to form a liquid state due to natural processes of pressure reduction and earth temperature drop. For example at Walden, Colorado, the bottom-hole conditions in the reservoir are about 2350 p. s. i. a. and 145° F. at a depth of about 5100 feet, and the well head conditions are about 1050 p. s. i. a. at about 75° F.; the reservoir vapor in this case contains approximately 2 mole per cent petroleum oil, 90 mole per cent $CO_2$, and 8 mole per cent of methane and other normally gaseous materials (water-free basis). The vapor phase in the reservoir is, of course, normally saturated with moisture.

Under the conditions of the field example just given, natural condensation of the reservoir vapor mixture up the well bore delivers a fluid consisting of a liquid phase and a gas phase in approximately the volume proportions of 55 and 45 per cent, respectively.

Relatively small variations in conditions at the well head will change the liquid-vapor proportions. For instance at well head conditions of 70° F. and 1100 p. s. i. a., the well head fluid consists of about 94 per cent liquid and 6 per cent gas. Hence, it is seen that the phase relationship is sensitive to relatively small changes in temperature and pressure, mostly from seasonal changes. In all cases of naturally existing conditions, however, the liquid phase at the well head is so rich in $CO_2$ that it is actually a solution of petroleum in liquid $CO_2$. Such a solution cannot be flash-separated to remove $CO_2$ without severe losses of oil physically carried and/or carried into the vapor state by the vaporizing $CO_2$. More important, however, is that uncontrolled flow of liquid from the well head under rapid depressuring-volatilization conditions results in so great a cooling that there quickly results a solidification of the stream by the formation of solid $CO_2$-hydrates at temperatures of the order of 50–55° F. Supplying fuel to avoid such solidification is often equivalent to a substantial proportion, if not more than the amount of the recoverable oil.

Seasonal variations of well head conditions may occur in the range of about 65–85° F. along with corresponding changes in pressure. Under natural conditions, the maximum well head temperature of $CO_2$-oil vapor phase reservoirs will generally not exceed about 90° F. regardless of the reservoir temperatures and pressures which may prevail.

Known methods of recovering liquid hydrocarbons from natural gas condensate fields have been attempted on the described $CO_2$ mixtures and have not met with any material success. Simple field separators controlled by well head conditions yield a liquid phase too rich in $CO_2$. The quantity of such liquid will vary also because of the sensitivity of the phase relations to minor changes in temperature and pressure. The more important of these factors is that the liquid phase has the properties of solution of oil in liquid $CO_2$ which, as previously noted, escapes satisfactory recovery of the oil by reduced pressure vaporization of the $CO_2$. The field separator becomes further inapplicable when $CO_2$ must be recovered for recycling and maintaining pressure of the reservoir.

The phase conditions of the well head fluid from a $CO_2$-hydrocarbon vapor phase reservoir are such that the known separation processes applicable to natural gas vapor phase fluids cannot be used. The latter processes generally require considerable cooling and pressure reduction on the well fluid to condense out the liquid hydrocarbon components. Were this done on the $CO_2$ well fluids, no separation whatever could be accomplished since further condensation of all components, and formation of solid hydrates as well, would readily occur. And if hydrate inhibitors were added to the $CO_2$ system, then continued cooling by pressure reduction would largely follow the $CO_2$ liquid-vapor curve to the solid state of $CO_2$ and entrainment of the oil therewith.

Broadly stated, my invention for the recovery of normally liquid hydrocarbons from a well effluent at least a portion of which is a liquid phase comprising a major proportion of $CO_2$ and a minor proportion of petroleum hydrocarbons comprises the steps of shifting the solution or phase equilibrium of such liquid phase, at least partially by the addition of heat to the well effluent, to a condition under which the major proportion of such liquid phase is normally liquid petroleum hydrocarbons and contains less than about 40 liquid volume per cent dissolved $CO_2$, separating the shifted liquid phase from the predominantly gaseous $CO_2$ in contact therewith, reducing the pressure on said separated liquid phase to vaporize substantially therefrom the $CO_2$ dissolved therein and recovering the normally liquid hydrocarbons therefrom. A specific embodiment of my invention further includes the steps of compressing the $CO_2$-containing vapor phase which had been equilibrium-separated from well effluent, cooling the compressed vaporous $CO_2$ in heat exchange relation with the well head effluent fed to the process, liquifying said cooled vaporous $CO_2$ and returning the liquified $CO_2$ to a formation input well.

One object of this invention is to economically recover petroleum oil from subterranean $CO_2$-oil vapor phase mixtures.

Another object is to recover $CO_2$ in a liquid state as a useful process function.

A further object of my invention is to recover the $CO_2$ in a liquified state from petroleum-$CO_2$ mixture for economic reservoir recycling and pressure maintenance.

Figure 2:
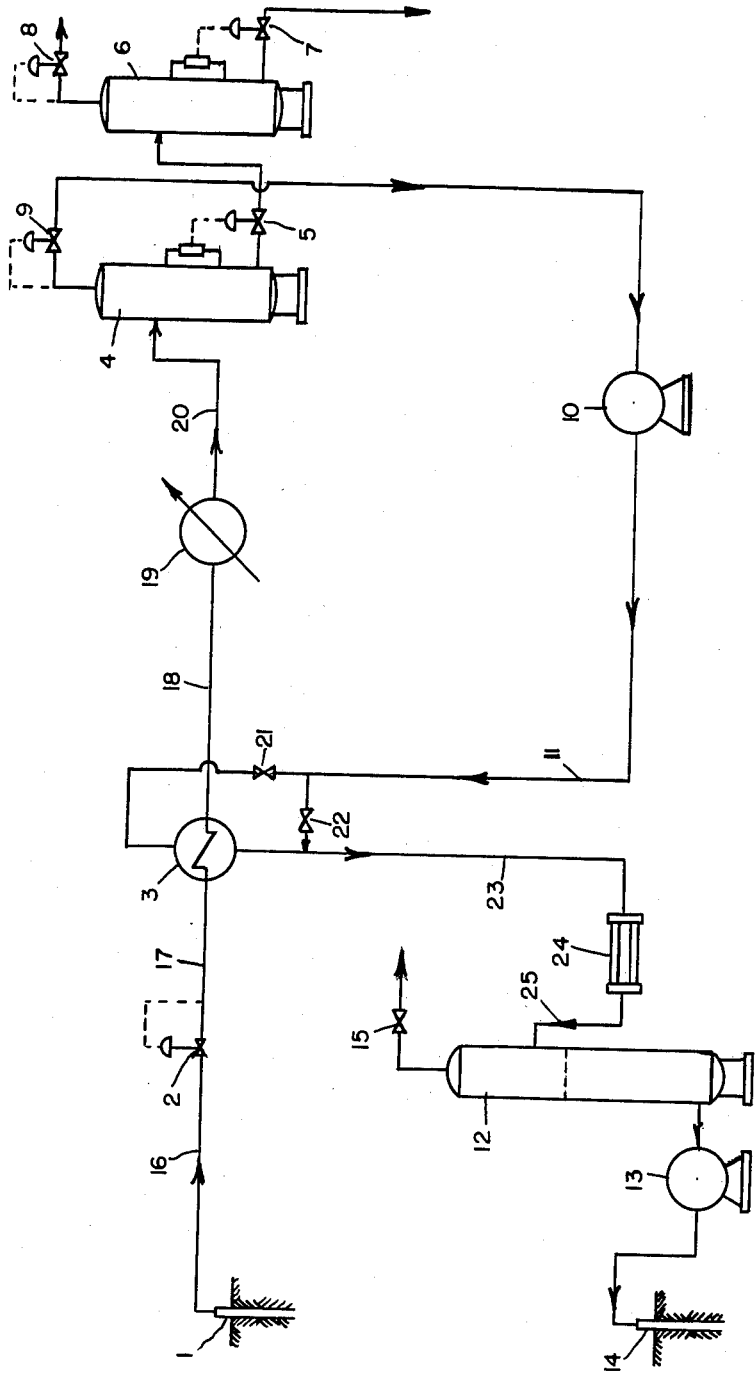

In the appended drawings, Fig. 1 illustrates a thermodynamic representation of my process and its operating principles; superimposed thereon in correlated pressure and temperature relationship is an exemplary phase diagram of a reservoir $CO_2$-oil mixture to which this invention applies. Fig. 2 illustrates a schematic arrangement of flow and apparatus suitable for the process of my invention. The like numbers of each figure have reference to a given feature of the process.

Refer now to Figure 1 which exemplifies an embodiment of my invention based upon the principles illustrated therein. The area generally designated by A, B, C, and E comprises a phase diagram which shows the equilibrium distribution of phases for a given $CO_2$-oil mixture (liquid and vapor) according to various conditions of pressure and temperature. The phase diagram shown depicts the physical behavior of a $CO_2$-oil mixture (single vapor phase in the reservoir) containing about 2 mole per cent petroleum, 90 mole per cent $CO_2$, and 8 mole per cent other normally gaseous components. Curve AB of the diagram is the bubble point locus, otherwise designated 100 volume per cent liquid, of this particular reservoir fluid along which the fluid will become substantially condensed to the liquid state. Critical conditions of pressure and temperature for the mixture occur at point B. Curve B—C is the dew point locus, otherwise designated 0 volume per cent liquid, along which the wholly vaporous mixture which exists in the reservoir will just begin to condense out a liquid phase to also contain both oil and $CO_2$. The remaining curves of the phase diagram show the loci of pressure and temperature conditions required for given proportions of liquid phase in equilibrium with vapor phase to form, the proportions of which are expressed as per cent of the total volume of the fluid phases. The reservoir conditions for a single vapor phase prevail generally at pressures to the right of the dew point curve (BC) and above the critical temperature of the mixture (at point B); point R, for instance, represents one set of reservoir conditions which produces a homogeneous and wholly vaporous fluid mixture for which the equilibrium phase diagram shown is representative.

The well head conditions are represented as shown at production well 1. It will be noted from the phase diagram that the well effluent exists in a zone of high liquid condensation; for example, a volume of liquid which exceeds 50 volume per cent of the total volume of the well head fluid. The proportion of $CO_2$ in the liquid phase of the well head fluid is so great as to constitute a solution of oil in $CO_2$; in the present example, for instance, the $CO_2$/oil liquid volume ratio is approximately 7/1.

If a $CO_2$-oil well head fluid of the character herein described is subjected to free expansion to evolve the $CO_2$, the fluid quickly forms solid hydrates by having dropped into the solid hydrate region below curve H—I; equipment flow lines then clog and further separation virtually ceases. Applying heat to the freely expanding mixture requires fuel more than equivalent to the hydrocarbons contained therein and even then much of the hydrocarbon oil will be lost by entrainment and revaporization in the evolving $CO_2$.

I have, therefore, developed conditions of processing which provide economic separation of such $CO_2$-hydrocarbon mixtures. The resulting process is also outlined in Figure 1 thermodynamically by the numeral series 1–14. Beginning with the well head fluid at 1, there is a slight pressure drop to point 2 sufficient for control of flow in the process. From point 2, the temperature of the fluid is raised by compression-heated separated $CO_2$ though an exchanger denoted by 3. The well effluent is heated because it is essential to shift the equilibrium phase distribution into the zone bounded by curves D and E of the phase diagram. By this shift in phase equilibrium, the composition of the liquid phase changes by a reduction of its $CO_2$ content to such an extent that the liquid solution of oil in $CO_2$ which existed at the well head is reversed to a liquid solution containing $CO_2$ dissolved in oil. The solution of $CO_2$ in oil is then drawn from separator 4 through line 5 and is readily flashed by pressure reduction along path 5—6 to eliminate residual dissolved $CO_2$ under essentially adiabatic conditions for substantial recovery of normally liquid petroleum hydrocarbons therefrom. In the example given, the phase shift produces a liquid phase amounting to about 8 volume per cent of the total well fluid volume and it then contains about one volume $CO_2$ dissolved in 4 volumes of oil (liquid basis). Contrast this with the liquid phase of the well head which contains about 6 liquid volumes of $CO_2$ in which there is dissolved one liquid volume of oil.

Separation of the $CO_2$ from the well fluid, amounting up to about 98 per cent of that contained therein, is accomplished by the equilibrium phase shift in separator 4 and is withdrawn therefrom in the gaseous state through line 9. Such recovery of the $CO_2$ provides a sufficient amount for efficient recycling and pressure maintenance of the reservoir.

Reinjecting $CO_2$ in the gaseous state, however, requires considerably more energy than is desirable. The preferred practice of my invention, therefore, includes liquefaction of the recovered $CO_2$ in order to reduce injection energy requirements. Moreover, employing the liquefaction step within the process is desirable for obtaining efficient operation of my process. To accomplish these things, the gaseous $CO_2$ leaving separator 4 at 9 is compressed through compressor 10 along the thermodynamic path 9—11. In so doing, heat of compression is developed as noted by the higher temperature existing at point 11. Having reached the conditions indicated at point 11, the heated gaseous $CO_2$ enters into heat exchange relation with the well head fluid through exchanger 3. The thermodynamic path effecting this cooling is represented by path 11—12. The steps of heating by compression and cooling by heat transfer liquifies the $CO_2$ to a point on or below the liquid-vapor curve F—G for pure $CO_2$ but at a suitable point above the $CO_2$ hydrate region bounded by curve H—I. It must be remembered that the recovered $CO_2$ still contains moisture by reason of the water vapor contained in the reservoir fluid. Therefore the moist $CO_2$ must be raised to a somewhat higher pressure level after leaving separator 4 in order that liquefaction by cooling will not plunge it into the solid hydrate regions, thus complicating its utilization for reservoir injection. The processing described which avoids $CO_2$ hydrate formation also serves an essential feature of my process in supplying heat to the incoming well head stream.

The liquid $CO_2$ obtained along curve F—G or subjacent thereto but above the hydrate region is then pumped by liquid pump 13 into injection well 14 under conditions of pressure and temperature of the same order as exist at a producing well 1. Such conditions are very substantially less than the reservoir conditions represented at point R with a consequent saving in energy compared with requirements for gaseous injection. In accomplishing this saving, the natural force of a substantial hydrostatic head of liquid $CO_2$ in the well bore is then used to advantage. While the liquid $CO_2$ in descending the well bore undergoes a naturally increasing temperature to become gaseous in the reservoir, nevertheless a sufficient liquid head remains to maintain an uninterrupted downward pouring of the $CO_2$ into the formation.

Figure 1 illustrates a preferred practice of my invention wherein the phase shift of the well effluent is accomplished by the addition of heat to the effluent together with a reduction of the pressure thereon. The phase shift may be accomplished by the application of heat alone to reach the optimum separation region of the phase diagram referred to previously. However, dropping the pressure is highly desirable for effecting a saving from a greater heating requirement which would otherwise be necessary. Since the process is a continuous one, pressure reduction is also an obvious advantage for maintaining process flow thus minimizing energy requirements for pumping operations therein.

The pressure of separation of the liquid and vapor phase is not so much the critical factor when a consideration of the phase diagram shows that it is more important to establish an optimum liquid-vapor phase equilibrium such as represented by the zone between curves D and E. It will be seen that a proper phase equilibrium for this separation exists over a relatively wide pressure range. From a process viewpoint, however, the upper pressure limit is controlled by well head pressure; the lower pressure is limited by the region of solid hydrate formation.

To establish optimum operating conditions, therefore, my process operates at pressures from about 700 p. s. i. a. to about 1200 p. s. i. a., and preferably in the range of about 750–1000 p. s. i. a.; the corresponding temperature range is about 85–130° F.; preferably 95–110° F. Variations in the oil content of the reservoir vapor phase up to a limiting content of about 10 mol. per cent therein will be accommodated by the foregoing pressure and temperature conditions.

Each composition of the reservoir vapor will, of course, have its own characteristic equilibrium phase diagram. As the oil content increases from that exemplified in Fig. 1, the critical point of the mixture increases approximately linearly to the right of point B and on a line drawn through the $CO_2$ critical point and the critical point (B) of the reservoir vapor fluid there shown. Also, as the oil content increases, the over-all area or envelope of the diagram broadens out transversely of the bubble point locus (the bubble point locus of an oil-richer mixture falls parallelly lower than that shown). However, the liquid-vapor equilibrium zone although changing in liquid content for optimum separation as its oil contact increases, will remain substantially constant within the process pressure and temperature conditions above described. The oil-richer reservoir vapor mixtures are found under generally higher reservoir pressures and temperatures but such conditions are not appreciably reflected by pressure and temperature to be observed at the well head which becomes maximum at about 1200 p. s. i. a. and 90° F.

In the case of reservoirs which contain $CO_2$-hydrocarbon vapor phase mixtures in contact with liquid petroleum deposits may flow both the vapor and liquid into the well from the formation and consequently produce such liquid at the well head along with the condensed reservoir vapors. Such well effluents may also be processed in toto in accordance with my invention.

An apparatus flow diagram is shown in Fig. 2 to illustrate a preferred form of the process of my invention. Insofar as like numbers of this figure also occur in Fig. 1, the physical embodiment of the process can be readily compared with the thermodynamic principles upon which the process is based. Description of the process according to Fig. 2 now follows:

*Composition of $CO_2$ reservoir vapor*
[Gas/oil ratio=33,000 cu. ft. gas/bbl. oil]

| Component: | Mol. per cent |
|---|---|
| $CO_2$ | 90.3 |
| $N_2$ | 4.8 |
| Gaseous hydrocarbons | 2.8 |
| Hydrocarbon oil | 2.1 |
| A. P. I. gravity, 48.4°. | |
| Average mol. wt. 145. | |
| | 100.0 |

Phase proportions at well head conditions of 72° F. at 1090 p. s. i. a.:
Liquid about 90 vol. per cent—Liquid volume ratio of $CO_2$/oil approximately 12/1.
Vapor about 10 vol. per cent.

The well effluent flows in line 16 through flow control valve 2 whereby the pressure is reduced, say about 100 p. s. i. The well fluid flows from valve 2 and line 17 through heat exchanger 3 where it is heated by countercurrent flow with a process separated and heated $CO_2$ stream. Here the well fluid undergoes a shift in its liquid-vapor equilibrium by virtue of the heating to produce a liquid phase containing preferably less than 25 liquid volume per cent dissolved $CO_2$ and, according to this example, the $CO_2$ in the liquid phase was thus reduced to about 14 liquid volume per cent thereof. This optimum liquid phase amounted to about 7.3 volume per cent of the well effluent. The heated effluent flows on through line 18, auxiliary heater 19 and line 20 into a suitable liquid-gas separator 4. The auxiliary heater 19 is useful for final adjustment of temperature to attain the optimum phase relations, it serves primarily, however, in caring for seasonal temperature variations at the plant site. In separator 4, the adjusted liquid phase, now a solution of $CO_2$ in hydrocarbon oil, has a temperature of about 100° F., and a temperature-correlated pressure of about 800 p. s. i. gauge. This $CO_2$-oil solution flows from separator 4 through line and valve 5 into flash tank 6 where the dissolved gaseous components, principally $CO_2$, are evolved by reduction of pressure to nearly atmospheric, say about 10 p. s. i. gauge. Cooling incident with this pressure reduction and vaporization of the dissolved liquid $CO_2$ reduces the temperature to about 50° F.; thus the removal of the relatively small remaining proportion of $CO_2$ in the oil is not interfered with by solid hydrate formation. The pressure in separator 4 is closely regulated by liquid level and gas-pressure controlled valves 5 and 9, respectively. The recovered oil, substantially free from $CO_2$, flows from tank 6 to storage through liquid level controlled valve 7. The gases evolved from tank 6 are exhausted through pressure controlled valve 8. This low pressure gas is so small in amount, about 2 to 5 per cent of the normally gaseous component of the well fluid, that it is usually field-flared.

Referring now to the high pressure $CO_2$ gas stream which was initially separated from the well head fluid, it flows from separator 4 to compressor 10 where the pressure upon it is sufficiently increased so that its subsequent liquefaction by cooling will not drop its pressure into hydrate solidification region as previously explained. Compressing this $CO_2$ stream about 200 p. s. i. above the pressure in separator 4 is usually sufficient to avoid solid hydrate formation upon subsequent liquefaction, and at the same time to provide a sensible temperature increase for heating the well head fluid for the purpose already described. The separated $CO_2$ is compressed to say about 1000 p. s. i. gauge and its temperature rises thereby to about 120° F. The compressed and heated gaseous $CO_2$ stream flows from line 11 and valve 21 through heat exchanger 3 wherein the well fluid is heated in countercurrent flow therewith. In this heat exchange step, the $CO_2$ stream becomes liquified by the cooling, or nearly so, and flows by way of line 23 through an auxiliary aftercooler 24 and line 25 into pressure vessel 12 from which liquid $CO_2$ is pumped to injection well 14 by means of pump 13. Vessel 12 is provided with a gas vent line and valve 15 for exhausting accumulated uncondensed gases ($CH_4$, $N_2$ etc.). By-pass valve 22 is provided as an additional means for control of heating conditions in exchanger 3. Aftercooler 24 is provided for further cooling of liquified $CO_2$ and, in some instances, to also insure completion of $CO_2$ liquefaction under all conditions of plant operation. In those instances where it is desirable to operate compressor 10 at higher pressures for greater heat development, cooler 24 is a useful adjunct therewith in processing the $CO_2$ stream. In the example of this process, the conditions in vessel 12 are about 65° F. and 800 p. s. i. gauge; pump 13 delivers liquid $CO_2$ to an injection well 14 at about 1075 p. s. i. gauge.

I have shown the operation of my process on reservoir vapor phase $CO_2$-oil mixtures wherein the normally gaseous component consisted predominantly of $CO_2$. I have found, however, that this gaseous component may contain as high as about 25 mol. per cent of normally gaseous hydrocarbons, such as methane, and still remain within the reach of my process since such vapor phase mixtures develop the type of equilibrium phase diagram which still behaves essentially according to the characteristic properties so peculiar to $CO_2$. Within the quantity limits given, the normally gaseous hydrocarbon components may so enrich the flash tank (separator 6 of the figures) gases as to form a valuable utility fuel both in the process and elsewhere. A concomitant increase of such gases in separator 4 of this process may be removed ventwise from the liquid $CO_2$ receiver 12 of the process.

I have described the principles upon which my improved process for the economic recovery of normally liquid hydrocarbons from $CO_2$-petroleum vapor phase mixtures and the practice of my invention has been illustrated by specific examples, the extension of which to other $CO_2$-oil compositions as described will be readily understood without intended limitations other than as defined in the claims appended hereto.

I claim as my invention:

1. A process for the recovery of normally liquid hydrocarbons from a well effluent comprising a major proportion of $CO_2$ and a minor proportion of petroleum hydrocarbons, at least a portion of which effluent is in a liquid phase, said process comprising the steps of shifting the phase equilibrium of said liquid phase, at least partially by the addition of heat, to a condition under which the major proportion of such liquid phase is petroleum hydrocarbons containing less than about 40 liquid volume per cent dissolved $CO_2$ removing said liquid phase, reducing the pressure on such last named liquid phase to vaporize substantially therefrom the $CO_2$ dissolved therein to thus recover the normally liquid hydrocarbons.

2. A process for the recovery of normally liquid hydrocarbons from a well effluent comprising a major proportion of $CO_2$ and a minor proportion of petroleum hydrocarbons, at least a portion of which effluent is in a liquid phase, said process comprising the steps of treating the entire well effluent which includes adding heat thereto and reducing its pressure to effect a shifting of the phase equilibrium of said liquid phase to a condition under which the major proportion of such liquid phase is petroleum hydrocarbons containing less than about 40 liquid volume per cent dissolved $CO_2$ removing said liquid phase, reducing the pressure on such last named liquid phase to vaporize therefrom substantially all of the $CO_2$ dissolved therein to thus recover the normally liquid hydrocarbons.

3. A process for the recovery of normally liquid hydrocarbons from a well effluent comprising a major proportion of $CO_2$ and a minor proportion of petroleum hydrocarbons, at least a portion of which effluent is in a liquid phase, said process comprising the steps of shifting the phase equilibrium of said liquid phase, by the addition of heat and reduction in pressure, to vaporize therefrom sufficient of its $CO_2$ content to leave a liquid phase which is predominantly petroleum hydrocarbons containing less than about 40 liquid volume per cent dissolved $CO_2$ removing said liquid phase, reducing the pressure on such last named liquid phase to vaporize substantially therefrom the $CO_2$ dissolved therein to thus recover the normally liquid hydrocarbons.

4. A process for the recovery of normally liquid hydrocarbons from a high pressure well effluent comprising a major proportion of $CO_2$ and a minor proportion of petroleum hydrocarbons, a dominant portion of which well effluent is in a liquid phase, said process comprising the steps of shifting the phase equilibrium of said liquid phase to vaporize therefrom sufficient of its $CO_2$ content to leave a liquid phase of predominantly petroleum hydrocarbons containing less than 40 liquid volume per cent dissolved $CO_2$ by raising the temperature of the well effluent to between about 85 to about 130° F. while reducing the pressure to between about 700 to about 1200 p. s. i. a. removing said liquid phase, reducing the pressure on the predominantly petroleum hydrocarbon liquid phase to vaporize therefrom essentially adiabatically the major proportion of the $CO_2$ dissolved therein to thus recover the normally liquid hydrocarbons.

5. A process for the recovery of normally liquid hydrocarbons from a high pressure well effluent comprising a major proportion of $CO_2$ and a minor proportion of petroleum hydrocarbons, a dominant portion of which well effluent is in a liquid phase, said process comprising the steps of shifting the phase equilibrium of said liquid phase to vaporize therefrom sufficient of its $CO_2$ content to leave a liquid phase of predominantly petroleum hydrocarbons containing less than 40 liquid volume per cent dissolved $CO_2$ by raising the temperature of the well effluent to between about 95 to about 110° F. while reducing the pressure to between about 750 to about 1000 p. s. i. a. removing said liquid phase, reducing the pressure on the predominantly petroleum hydrocarbon liquid phase to about atmospheric to vaporize therefrom essentially adiabatically substantially all of the $CO_2$ dissolved therein to thus recover the normally liquid hydrocarbons.

6. A process for the recovery of normally liquid hydrocarbons from a high pressure well effluent comprising a major proportion of $CO_2$ and a minor proportion of petroleum hydrocarbons, a dominant portion of which well effluent is in a liquid phase, said process comprising the steps of shifting the phase equilibrium of said liquid phase to vaporize therefrom sufficient of its $CO_2$ content to leave a liquid phase of predominantly petroleum hydrocarbons containing less than 40 liquid volume per cent dissolved $CO_2$ by raising the temperature of the well effluent to between about 95 to about 110° F. while reducing the pressure to between about 750 to about 1000 p. s. i. a. removing said liquid phase, reducing the pressure on the predominantly petroleum hydrocarbon liquid phase to about atmospheric to vaporize therefrom essentially adiabatically substantially all of the $CO_2$ dissolved therein to thus recover the normally liquid hydrocarbons, compressing the separated gaseous $CO_2$, cooling the compressed gaseous $CO_2$ in heat exchange relation with the well effluent to supply thereto the aforesaid initial heat and to liquify the $CO_2$, and returning the liquified $CO_2$ to an input cycling well.

(References on following page)

References Cited in the file of this patent

UNITED STATES PATENTS

| | | |
|---|---|---|
| 2,166,160 | King | July 18, 1939 |
| 2,188,013 | Pilat et al. | Jan. 23, 1940 |
| 2,281,865 | Van Dijck | May 5, 1942 |
| 2,355,167 | Keith | Aug. 8, 1944 |

OTHER REFERENCES

Uren: "Petroleum Production Engineering-Oil Field Development," page 7. Pub. by McGraw-Hill Book Co., New York, N. Y., 1934.